H. W. FOWLER & M. SELLERS.
JOURNAL BEARINGS.

No. 179,411. Patented July 4, 1876.

Witnesses.
T. J. Weinel
Claudius Parker.

Inventors.
Hervey W. Fowler,
Morris Sellers
by George H. Christy,
their Atty.

UNITED STATES PATENT OFFICE.

HERVEY W. FOWLER AND MORRIS SELLERS, OF CHICAGO, ILLINOIS.

IMPROVEMENT IN JOURNAL-BEARINGS.

Specification forming part of Letters Patent No. 179,411, dated July 4, 1876; application filed May 3, 1876.

*To all whom it may concern:*

Be it known that we, HERVEY W. FOWLER and MORRIS SELLERS, of Chicago, county of Cook, State of Illinois, have invented or discovered a new and useful Improvement in Journal-Bearings; and we do hereby declare the following to be a full, clear, concise, and exact description thereof, reference being had to the accompanying drawing, making a part of this specification, in which—like letters indicating like parts—

Figure 1:
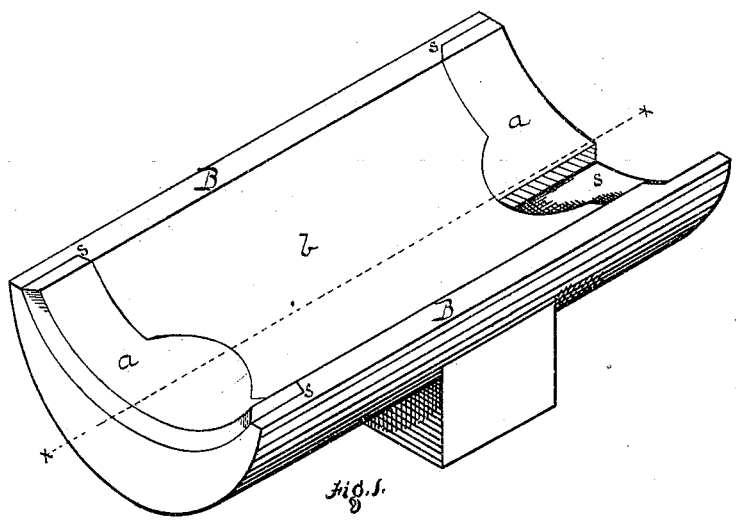
Figure 2:
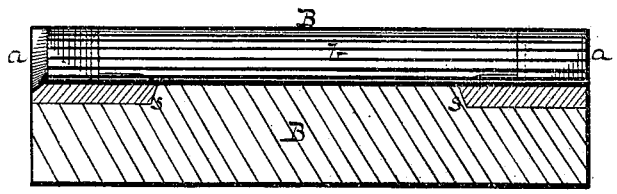

Figure 1 shows our journal-bearing in perspective, but with the soft-metal filling at one end in section. Fig. 2 shows the same in longitudinal vertical section.

The tendency of a journal is to wear out hollowing, and, in fact, after running for a greater or less length of time, it is almost certain to wear to this form. The use of a straight-faced hard-metal bearing on a journal so worn is open to various objections of a practical nature, which we overcome wholly, or in part, by making the bearing with a layer of comparatively soft metal at one or both ends of its bearing-face, the central or middle part being made of hard metal, such as is already in use for the same or kindred purposes. We apply this feature of construction to bearings of any known form.

The body or main part of the bearing B is cast in the usual or any known way, of any desired kind or quality of hard metal suitable for such uses, so as to have a hard-metal bearing-face, b, through its middle part, and, preferably, over the greater part of the bearing-surface.

Recesses S are left in one or both ends of the bearing-surface, and into these recesses we cast a soft-metal filling, a a, so that the bearing-faces thereof shall be even, or nearly so, with the face b. This casting is done in any of the ways known to the art, and the soft-metal material is such as is commonly employed for kindred purposes. By thus placing soft metal directly in the ends of a hard-metal bearing we provide for catching therein all sand, dust, grit, &c., which would otherwise work in between the journal and the hard face of the bearing, since such grit will become embedded in the soft metal, where it will do comparatively little damage. Also, the maximum amount of wear will be on the soft metal, which, with a hollow journal, will tend to wear the journal straight, or bring it back to its original form, without the necessity of returning it. Also, on account of the yielding character and wear of the soft metal, the journal will "get its bearing quicker," as the technical phrase is, and without danger of heating from friction.

We claim as our invention—

A journal-bearing having a hard-metal face through the middle part of its bearing-surface, and a soft-metal face at one or both ends, said bearing-faces being flush with each other, substantially as and for the uses set forth.

In testimony whereof we have hereunto set our hands.

HERVEY W. FOWLER.
   MORRIS SELLERS.

Witnesses:
 E. G. SLEIGHT,
 EDWARD HARING.